Patented Mar. 29, 1932

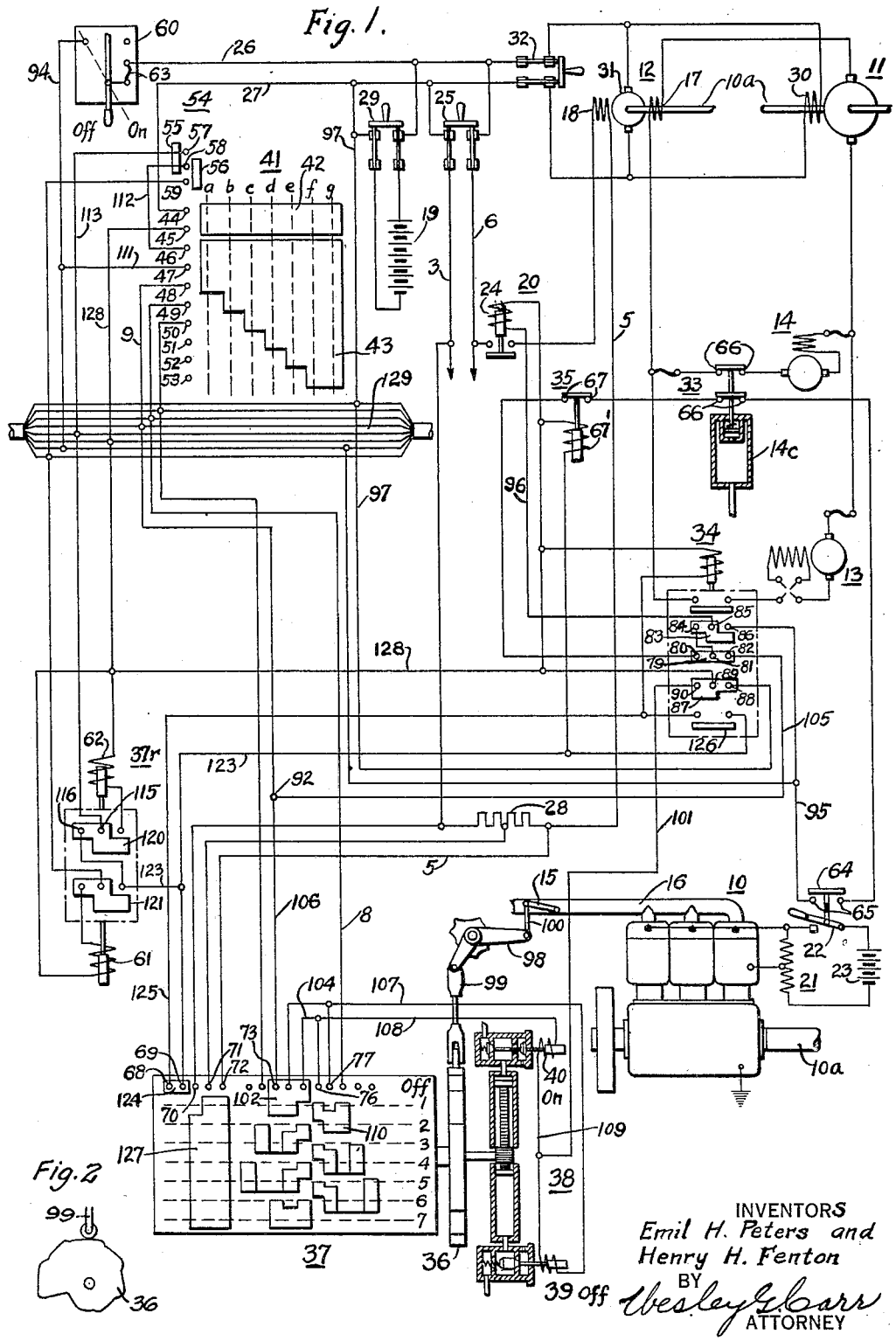

1,851,725

UNITED STATES PATENT OFFICE

EMIL H. PETERS, OF WILKINSBURG, AND HENRY H. FENTON, OF PITTSBURGH, PENNSYLVANIA, ASSIGNORS TO WESTINGHOUSE ELECTRIC AND MANUFACTURING COMPANY, A CORPORATION OF PENNSYLVANIA

ELECTRIC POWER DEVICE

Application filed July 6, 1926. Serial No. 120,565.

Our invention relates to improvements in gas-electric power devices and more particularly to power devices adapted for the operation of vehicles.

The object of the invention, generally stated, is the provision of gas-electric power devices that shall be simple and efficient in operation and readily and economically manufactured.

A more specific object of the invention is to provide for the control of the voltage of the generator of a gas-electric power device to obtain a maximum torque during the starting and acceleration of the motor.

Another object of the invention is to provide for the automatic acceleration of the gas engine of a gas-electric power device, independently of the manual means for controlling the acceleration, to effect the operation of the generator at the desired speed for the development of the voltage required for operating auxiliary devices.

A further object of the invention is to provide for the automatic acceleration of the engine of a gas-electric set, upon the operation of the controller, to effect the acceleration of the motor.

It is also an object of the invention to provide for the automatic control of the different power units of a plurality of vehicles operated in multiple.

Other objects of the invention will, in part, be obvious and will, in part, appear hereinafter.

The invention accordingly is disclosed in the embodiment thereof shown in the accompanying drawings and comprises the features of construction, combinations of elements and arrangement of parts which will be exemplified in the construction hereinafter set forth and the scope of the application of which will be indicated in the claims.

For a fuller understanding of the nature and objects of the invention, reference should be had to the following detailed description taken in conjunction with the accompanying drawings, in which:

Fig. 1 is a diagrammatic view of the complete power system; and

Fig. 2 is a side elevation of a cam provided for controlling the supply of fuel to the engine.

Referring to the drawings, the gas-electric power device illustrated comprises an internal-combustion engine 10, and an electric generator 11 and an exciter 12, both of which are mechanically connected to the engine 10, as by a shaft 10a.

In addition, a traction motor 13, of any well-known type, adapted for operating vehicles, is provided and is electrically connected to the generator 11. Further, in the particular embodiment of the invention shown, an auxiliary motor 14, for operating auxiliary devices, such as a compressor for maintaining the desired air pressure to operate the brakes, is provided and is electrically connected to the generator 11.

The gas engine 10 may be of any well known variable-speed type that is provided with a throttle 15 for controlling the supply of fuel. As shown, the throttle 15 is disposed in the intake manifold 16 that communicates with the cylinders.

The engine ignition circuit, shown generally at 21, may be energized in any suitable manner, as by the provision of a storage battery 23. A switch 22 is connected in the ignition circuit, so that the engine may be stopped, when desired.

It will be readily understood that the engine may be started by the use of an electric motor. Since this is common practice, a starting motor has not been illustrated; nor is there any source of supply of electrical energy shown for driving a starting motor.

In order to mechanically connect the gas engine, generator and exciter, any well known expedient, such, for example, as the mounting of the machines in alinement and connecting the shafts so as to provide what may be designated a common shaft 10a, may be adopted. It will be noted that, in the drawings, a single continuous shaft is shown but it is to be understood that this is merely for convenience in illustration.

The exciter is of the differentially compounded type, being provided with a shunt field winding 18 and a differential series-type field winding 17. In this particular embodiment of the invention, a storage battery 19 is provided for energizing the shunt field winding 18. In order to control the energization of the winding 18, an electromagnetically operated switch 20 is connected in the field circuit. This switch is operated by means of a coil 24, which is connected in the principal control circuit.

The differential field winding 17 is connected, through the traction motor, across the generator 11 and is disposed to oppose the shunt field winding 18. As will be observed, the winding 17 is composed of a small number of turns of comparatively heavy wire for carrying the total current delivered by the generator.

In addition to the magnetically operated switch 20 for controlling the energization of the shunt field winding 18, manually operated switch 25, of the blade type, is provided for connecting the shunt field winding 18 in series relation with a resistor 28 and across bus bars 26 and 27 that may be connected to the battery 19. Another manually operated switch 29, of the blade type, is interposed between bus bars 26 and 27 and battery 19.

As illustrated, the generator 11 is provided with a field winding 30 that is connected across the armature 31 of the exciter 12. The field winding 30 of the generator 11 may be also connected across the bus bars 26 and 27 through manually operable switch 32. The traction motor 13, referred to above, is connected in series relation with the differential winding 17 and across the armature of the generator 11. Accordingly, the current supplied to the traction motor will depend on the voltage developed by the generator 11.

As set forth above, the compressor motor 14 is connected across the armature of the generator 11. In order to subject the control of the motor to the pressure in the reservoir 14c that is provided for operating the brakes, a governor is used and is associated with a switch 33. In this manner, the motor 14 may be connected across the generator 11 when the pressure in the reservoir has fallen below a predetermined minimum.

The operation of the motor 13 may be controlled by means of a line switch 34 which will open on the failure of power. In addition to the line switch, in order to protect the motor 13 when loaded, because of automatic acceleration of the engine 10, a switch 35 is connected in series relation with the governor switch 33 and, as shown, is adapted to open the circuit for coil 24 and in consequence the field 18 of the exciter 12 before the motor 13 may be connected across the generator 11. The connections of the switch 35 will be fully described hereinafter.

The throttle of the engine 10 may be operated in a number of ways. In this particular embodiment, a cam 36 is mounted to rotate with the drum of a sequence device, shown generally at 37. This sequence drum is, in general, a well-known device, used in control systems for closing predetermined circuits in a desired order. Hence, it is considered unnecessary to go into details of its construction and operation.

An air engine 38, controlled by "off" and "on" coils 39 and 40, is used for actuating the sequence drum 37. This air engine may be of the type commonly used for actuating control drums. As shown, it embodies two valves that are controlled by the respective coils and is adapted to move in one direction when both the "on" and "off" valves are energized and in the opposite direction when they are deenergized. When the "on" valve is energized and the other deenergized, the air engine will be brought to a stop.

A master controller, of the drum type, shown generally at 41, is provided for effecting manual control of the air engine, thereby to control the step-by-step operation of the sequence drum 37 when the train is in motion. As shown, the controller 41 comprises a drum member carrying two main contact segments 42 and 43 that are disposed to engage a plurality of contact fingers 44 to 53, inclusive. It will be observed that the lower segment 43 is stepped, so that the contact fingers 46 to 53, inclusive, will be engaged in a predetermined sequence, as the controller is rotated in a forward direction.

In this embodiment of the invention, a master reverser 54, comprising two contact plates 55 and 56 and three contact fingers 57 to 59, inclusive, is provided for changing the connections to coils 61 and 62 to effect a setting of the main reverser 37r in the desired position for the direction of the motor operation.

A canopy switch 60, provided with a fuse 63, is connected in series with the bus bar 26. This switch serves to protect the control system from excessive currents.

Assume now that the vehicle or train has been standing and that the pressure in the air reservoir has fallen too low to serve for the operation of the brakes. In order to start the vehicle, the engine is set in operation to drive the compressor to build up the desired pressure in the reservoir 14c.

In starting the engine 10, the ignition switch 22 is closed and the engine 10 set in operation by means of a starting motor (not shown). An interlock 64, carried by the ignition switch 22, bridges a pair of contact members 65 when the switch is closed. Since the pressure in the reservoir is below the predetermined value necessary for the actuation of the brakes, the governor switch 33 which is provided with two contact plates is set in its closed position and it bridges two pairs of contact fingers 66.

The switch 35, referred to hereinbefore, is also closed and serves to bridge the contact fingers 67. As shown, the switch 35 is provided with an actuating coil 67', which is connected between the contact finger 45 of the controller and the contact finger 69 of the sequence drum 37. Thus, the actuating coil 67' may be energized upon the operation of the controller 41.

An interlock 79, carried by the line switch 34, is disposed to engage the contact fingers 80 to 82, inclusive, when the line switch is open. Two other interlocks, 83 and 87, are disposed for actuation by the line switch 34.

As illustrated, the interlock 83 is shaped to engage contact fingers 84 and 85 when the line switch is out and contact fingers 85 and 86 when the line switch is in. The interlock 87 is adapted to engage the contact fingers 89 and 90 when the line switch is in and the contact fingers 88 to 90, inclusive, when the line switch is out. Thus, when the controller is in its off position, and the pressure in the reservoir is below that required to actuate the brakes, the switches 33 and 35 are closed and the interlocks 87, 83 and 79 are set to complete predetermined circuits.

Upon the manual closing of switches 25, 29, 32 and 60, current flows from the positive terminal of the battery 19, through bus bar 26, switch 60, conductor 94, conductor 95, contact fingers 65 bridged by interlock 64, switch 33 bridging the contact fingers 66, and switch 35 bridging the contact fingers 67, the contact fingers 80 and 81 bridged by the interlock 79, the contact fingers 84 and 85 bridged by the interlock 83, conductor 96, the switch-actuating coil 24, contact finger 89, interlock 87, contact finger 88 and, through conductor 97, back to the negative pole of the battery 19 through switch 29. In this manner, the switch 20 is closed, connecting the battery 19 across the shunt field winding 18 to energize the exciter 12.

The energizing circuit of the exciter field winding may be traced from the positive terminal of the battery 19 through switch 29, conductor 26, switch 25, conductor 6, switch 20, field winding 18, conductor 5, resistor 28, conductors 3 and 27, back to the battery.

As soon as an exciter field is built up, the field winding 30 of the generator is energized and current is supplied from the generator 11 to the motor 14, which functions to operate the compressor.

In order to speed up the engine to operate the generator at a great enough speed to develop the desired voltage for operating the compressor motor, provision is made for rotating the sequence drum forward a number of steps independently of the controller 41. The rotation forward of the sequence drum serves to actuate the cam 36 and, through the bell crank 98 and push rods 99 and 100, the throttle 15. In this manner, the automatic acceleration of the engine 10 may be effected independently of the master controller.

The actuation of the sequence drum forward is effected through the establishment of a circuit from the live contact finger 81 referred to in the circuit already traced, through interlock 79, contact finger 82, conductor 105, leading to the contact finger 92, conductor 106, contact finger 73, contact segment 102 carried by the sequence drum, conductor 107, "off" actuating coil 39 of the air engine 38, conductor 101, contact fingers 90 and 88, bridged by the interlock 87, back to the negative terminal of the battery 19 through conductor 97. It will also be observed that the "on" actuating coil 40 of the air engine is connected in parallel relation to the valve-actuating coil 39 by means of conductors 104, 108 and 109, which are interposed between the contact segment 102 of the sequence drum 37 and the conductor 101.

In this manner, both the actuating coils of the air engine are energized and they serve to actuate the sequence drum forward one step. The contact segment 110 is disposed to engage the contact fingers 76 and 77 of the sequence drum when moving from the first to the second position. It will, therefore, be observed that the circuit established through the actuating coils 39 and 40 will be maintained until the sequence drum passes its second position.

As the cam 36 is rotated forward, the bell crank 98 is rotated counter-clockwise, operating the throttle 15 to increase the fuel supply to the engine. The generator is directly connected to the shaft of the engine, and its speed will increase with the speed of the engine, thereby increasing the generated voltage that is impressed upon the motor 14.

When the pressure in the air reservoir 14c reaches a predetermined value, the governor switch 33 will be actuated to its open position, thereby breaking the circuits described above.

Assume now that the operator desires to set the train in motion and that he actuates the controller 41 to its position a. The contact segment 42 bridges the contact fingers 44 and 45. A circuit is now established from the positive terminal of the battery through switch 60 the upper portion of conductor 94, conductor 111, contact finger 47, contact segment 43, contact finger 46, conductor 112, contact fingers 58 and 57, bridged by contact plate 55, conductor 113, through contact fingers 115 and 116, bridged by the contact segment 120, conductor 123 to the actuating coil 67' of switch 35, conductor 128, contact finger 45, controller segment 42 to the negative bus 27. Energization of coil 67' causes the opening of the circuit for coils 39 and 40 of the air engine 38. When these coils are deenergized the sequence drum moves to the "off" position, whereupon the contact fingers 68 and 69 are bridged by the sequence drum segment 124. Since conductors 123 and 128 are energized, the actuating coil of line switch 34 is energized by a circuit from conductor 123, to contact finger 69, segment 124, contact finger 68, conductor 125, and actuating coil of the switch 34 to the conductor 128. In this manner, the line switch 34 is closed, connecting the motor 13 across the generator.

It will be noted that, if the sequence drum 37 is not in its "off" position, the contact fingers 68 and 69 are not bridged by the contact segment 124 and, consequently, the line-switch-actuating circuit cannot be closed. In this manner, the motor 13 is protected, since it cannot be connected across the generator until the sequence drum is set in its "off" position, thereby reducing the speed of the engine 10 and the voltage across the generator 11.

In order to retain the line switch 34 closed during the operation of the sequence drum, an interlock 126 is provided on the line switch 34. As shown, this interlock bridges a pair of contact fingers provided in the line-switch-actuating circuit and thereby short-circuits the contact fingers 68 and 69.

In order to avoid the danger of applying an excessive voltage to the motor 13 before the train has reached a speed sufficient to effect the building up of a desired counter-electromotive force in the motor to prevent an excessive flow of current, the differential winding 17 is utilized.

When the controller is actuated to position $a$, an energizing circuit for the actuating coil of the "off" valve of the air engine 38 is established and may be traced from the energized contact segment 43 through contact finger 48, conductors 9 and 106, contact finger 73, contact segment 102, conductor 107, the actuating coil 39 of the "off" magnet valve, conductor 101, contact fingers 90 and 89, bridged by the interlock 87, conductor 128, contact fingers 45 and 44, bridged by the contact segment 42 of the controller drum 41, conductor 27 and switch 29 back to the negative side of the battery 19. As will be observed, the actuating coil 40 of the "on" magnet valve of the air engine is connected in parallel with the coil 39 when the sequence drum stands in its "off" position. Therefore, when the controller drum 41 is actuated to position $a$, both valves of the air engine are operated, and the sequence drum 37 is rotated forwardly.

Ordinarily, in sequence drums of this type, suitable for controlling the operation of an air engine, the contact segments and connections are arranged to interrupt the energizing circuit of one of the magnet valves and stop the engine after it has advanced one step. Then, in order to advance the engine and sequence drum another step, it is necessary to actuate the controller to its next position, for instance, in this case, to position $b$ energizing conductor 8.

However, in this particular case, since provision is made for the actuation of the sequence drum to position 2 in response to the functioning of the means for connecting the motor 14 to the generator 11, the sequence drum is actuated to its second position upon the movement of the controller drum 41 to position $a$.

When the controller drum is actuated to position $c$, the contact segment 43 engages contact finger 50, energizing the conductor 7 and the actuating coils of the "on" and "off" magnets of the air engine through the contact segment 4, and the sequence drum is rotated another step to position 3. Sequence drums of this type are well known, and the manner in which drum 37 is operated to its final position will be readily understood.

Assume, for example, that the controller 41 is rotated forward rapidly to operate the sequence drum to its final position, thereby giving the engine and generator their maximum speed before the motor can correspondingly accelerate the train.

The generator, excited by the winding 30, tends to continually increase the voltage, but the differential winding 17 opposes the rapid building up of voltage. Further, it will be readily understood that, when the speed of the train and, therefore, of the motor is slow, a low generator voltage will tend to cause a large current to flow through the motor. However, as the current increases, the excitation of the winding 17 will be increased, thereby lowering the voltage of the generator. Thus, provision is made to vary the voltage of the generator directly with the speed of the train or to vary the excitation of the field inversely as the load on the generator.

In order to vary the excitation of the exciter 12, the resistance 28 is connected in series relation with the shunt field winding 18. As will be observed, the resistance member 28 is divided into sections and connected to the contact fingers 70 to 72, inclusive. A contact segment 127 is mounted on the sequence drum 37 and serves to short-circuit the resistance unit 28 in steps, thereby to gradually vary the field excitation of the exciter. In this particular embodiment of the invention, the contact segment is adapted to short-circuit the resistance unit 28 after the sequence drum has reached the second step and to maintain it short-circuited during the remainder of the rotation of the sequence drum.

It will be understood that the contact segments provided on the sequence drum 27, that have not been referred to, are disposed so that they will co-operate with the controller to effect a step-by-step operation of the sequence drum 37 and cam 36, as the controller is moved forward notch by notch. If the sequence drum is not set in its "off" position when the controller is moved to its first position and the reverser has been set in position, the circuit established through the contact segments 120 and 121 will co-operate with the air engine to effect the proper setting of the sequence drum.

In order to operate a number of vehicles in multiple, the train-line wires are continued, as shown at 129. Then jumpers may be provided to join the line wires of the different vehicles to form a train line so that a number of vehicles may be operated in multiple by one operator located in any vehicle.

While the illustrated example constitutes a particular embodiment of our invention, we do not limit ourselves strictly to the exact details herein illustrated, since, manifestly, the structure may be considerably varied without departing from the spirit of the invention as set forth in the appended claims.

We claim as our invention:

1. In a gas-electric power system, in combination, an internal combustion engine provided with a fuel-throttle, a generator driven by the engine, main and auxiliary motors disposed to be connected to the generator, means for effecting the acceleration of the motors, means actuated by a motor accelerating means disposed to operate the engine throttle, manually operable means for controlling the operation of the motor accelerating means and means for utilizing the motor accelerating means to actuate the engine throttle independently of said manually operable means whereby the engine may be accelerated to develop a predetermined voltage in the generator to operate the auxiliary motor.

2. In a gas-electric power system for vehicles, in combination, an internal combustion engine provided with a fuel-throttle, a generator driven by the engine, a propelling motor and an auxiliary motor disposed to be connected to the generator, means for effecting a step-by-step acceleration of the motors, manually operable means for controlling the operation of the motor accelerating means, means actuated by said motor accelerating means for operating the engine throttle and means for effecting a partial operation of said motor accelerating means when said manual control means is in its off position thereby to accelerate the engine and generate a voltage sufficient to operate said auxiliary motor.

3. In a power system, in combination, an internal-combustion engine, a generator driven by the engine, main and auxiliary motors for performing different operations disposed to be connected to the generator, means for connecting the main motor to the generator, means independent of the main motor connecting means and responsive to operating conditions for connecting the auxiliary motor to the generator and means responsive to the operating conditions of both motors for effecting the acceleration of the engine.

4. In a power system, in combination, an internal-combustion engine, a generator driven by the engine, main and auxiliary motors for performing different operations disposed to be connected to the generator, means for connecting the main motor to the generator and means independent of the main motor connecting means dependent on the operating conditions of both motors responsive to operating conditions for connecting the auxiliary motor to the generator, and means disposed for operation upon the connection of the auxiliary motor to the generator for accelerating the engine.

5. In a power system, in combination, an internal-combustion engine, means for controlling the supply of fuel to the engine, a generator driven by the engine, a motor disposed to be connected to the generator, control means for effecting the connection of the motor to the generator, a sequence drum disposed for actuation in response to the operation of the control means, and means actuated by the sequence drum for actuating said fuel-control means to vary the speed of the engine.

6. In a power system, in combination, an internal-combustion engine, a throttle for controlling the supply of fuel to the engine, a generator driven by the engine, means for exciting the generator, a motor disposed to be electrically connected to the generator, control means for establishing an electrical connection between the motor and generator, a sequence drum disposed for operation in response to the actuation of said control means, and means actuated by said sequence drum for operating the throttle to control the speed of the engine.

7. In a power system, in combination, an internal-combustion engine, a throttle for controlling the fuel supply to the internal-combustion engine, a generator disposed to be driven by the engine, means for exciting the generator, a motor disposed to be electrically connected to the generator, control means for establishing the electrical connections between the generator and motor to effect the operation of the latter, means disposed to operate in response to the actuation of the control means to operate said throttle to control the fuel supply to the engine and thereby control the engine speed, an auxiliary motor for performing operations independently of the other motor, means responsive to operating conditions for connecting the auxiliary motor to the generator and means dependent on the operating conditions of both motors actuated by said auxiliary-motor-connecting means to effect the operation of the throttle independently of the control means to vary the speed of the engine and increase the generator voltage.

8. In a power system, in combination, an internal-combustion engine, a generator driven by the engine, main and auxiliary motors for performing different operations disposed to be connected to the generator, a line switch for connecting the main motor to the generator, control means for effecting the operation of the line switch to connect the main motor to the generator, means actuated by the control means for varying the speed of the engine, and means for connecting the auxiliary motor to the generator disposed to cooperate with the control means for the main motor to effect a predetermined acceleration of the engine.

9. In a power system, in combination, an internal-combustion engine, a generator driven by the engine, main and auxiliary motors for performing different operations disposed to be connected to the generator, a line switch for connecting the main motor to the generator, control means for effecting the operation of the line switch to connect the main motor to the generator, means actuated by the control means for varying the speed of the engine, and means for connecting the auxiliary motor to the generator disposed to cooperate with the control means for the main motor to effect automatically the acceleration of the engine upon the connection of the auxiliary motor to the generator when the main motor is stopped.

In testimony whereof, we have hereunto subscribed our names this first day of July, 1926.

EMIL H. PETERS.
HENRY H. FENTON.